US006135536A

United States Patent [19]

Ciavaglia et al.

[11] Patent Number: 6,135,536

[45] Date of Patent: Oct. 24, 2000

[54] VEHICLE LIFTGATE POWER OPERATING SYSTEM

[75] Inventors: Michael Antonio Ciavaglia, Dearborn; Joseph Michael Johnson, Huntington Woods, both of Mich.

[73] Assignee: Delphi Technologies, Inc., Troy, Mich.

[21] Appl. No.: 09/245,631

[22] Filed: Feb. 5, 1999

[51] Int. Cl.[7] .......... B60J 5/10

[52] U.S. Cl. .......... 296/146.4; 296/146.8; 296/106; 49/334; 49/335

[58] Field of Search .......... 296/146.4, 146.8, 296/106, 56; 49/334, 335

[56] References Cited

U.S. PATENT DOCUMENTS 2,893,727 7/1959 Barnard .......... 296/106 X 5,221,239 6/1993 Catlett .......... 49/334 X

FOREIGN PATENT DOCUMENTS 401314621 12/1989 Japan .......... 296/146.4

*Primary Examiner*—Dennis H. Pedder

*Attorney, Agent, or Firm*—Patrick M. Griffin

[57] ABSTRACT

A power operating system for opening and closing a vehicle liftgate has a pair of drive units supported on the vehicle roof and connected to the liftgate for opening and closing the liftgate. Each drive unit includes a planetary gear set that has a sun gear, at least one planet gear and a partial ring gear. The sun gear which is located on the pivot axis is driven by a reversible electric motor. The planet gears are rotatably mounted on a carrier that is attached to the hinge portion that moves with the lift gate and the partial ring gear is attached to the hinge portion that is fixed on the vehicle body.

11 Claims, 3 Drawing Sheets

2/3

VEHICLE LIFTGATE POWER OPERATING SYSTEM

TECHNICAL FIELD

This invention relates to a power operating system for a vehicle liftgate that is pivotally attached to a vehicle compartment for pivotal movement about a generally horizontal axis and more particularly to a power operating system that will move a liftgate from a closed position to a fully open position and from an open position to a fully closed position.

BACKGROUND OF THE INVENTION

Utility vehicles and vans with liftgates that are hinged at the top about a generally horizontal axis are used by large numbers of people today. Some of these liftgates are large and heavy. Their size and weight make some liftgates difficult to open and close. Some of the liftgates are also a great distance above the ground when they are fully opened. Their height above the ground makes them very difficult for some people to close. For these and other reasons many people would like to have a power operating system for opening and closing the liftgate.

A number of different liftgate openers have been tried in recent years. Some of these liftgate openers have a single cable that opens and closes a liftgate in connection with a counterbalance system, such as gas cylinders. Liftgates with a single cable opener and closer are generally trunk lids that are lightweight and have a relatively small range of movement.

Gas cylinder output varies with temperature. This complicates power liftgate systems that rely on gas cylinders to open the liftgate. The gas cylinder or cylinders must be strong enough to open the liftgate on the coldest date (−40° C.). This results in gas cylinders that increase closing resistence substantially on the hottest day (80° C.). Therefore a very large electric motor must be used to close the liftgate.

Liftgates that have two or more gas cylinders for a counter balance system are common. These gas cylinders generally occupy a position in which their axis is substantially parallel to the liftgate so that the gas cylinders are hidden when the liftgate is closed. In this closed position the moment arm of the gas cylinders is quite small. With such systems the lift gate may move about one-third of their total travel range before the gas cylinders exert sufficient force to open a liftgate further without the application of an independent lifting force. There are even some systems in which the gas cylinders pass over center and bias a liftgate toward a closed position when the liftgate is closed. With these self closing systems a liftgate may need to be more than one-third open before the gas cylinders will open the liftgate further.

The force required to hold a liftgate in a given position along its path of movement from a closed position to a fully open position varies substantially in some liftgate opening systems. A power liftgate closer must exert sufficient force to hold a liftgate in any given position along the path of movement, plus the force to overcome friction, and plus the force required to accelerate the liftgate during liftgate closing. It the total force exerted by the liftgate power closure varies substantially from one position between fully opened and closed to another position between fully opened and closed, it may be difficult for the control system to detect an obstruction and stop the liftgate without incurring damage to the vehicle or to the object that obstructs the lifegate.

SUMMARY OF THE INVENTION

An object of the invention is to provide a vehicle liftgate power operating system that can move a liftgate from a closed position to a fully opened position and from an open position to a fully closed position.

A feature of the invention is that the power operating system is compact and can fit in the hinge space without having to intrude into the passenger compartment.

An optional feature of the invention is that the power operating system includes a planetary gear set that can be combined with the liftgate hinge to reduce parts.

These and other objects, features and advantages of the invention will become more apparent from the following description of a preferred embodiment taken in conjunction with the accompanying drawing.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 4:
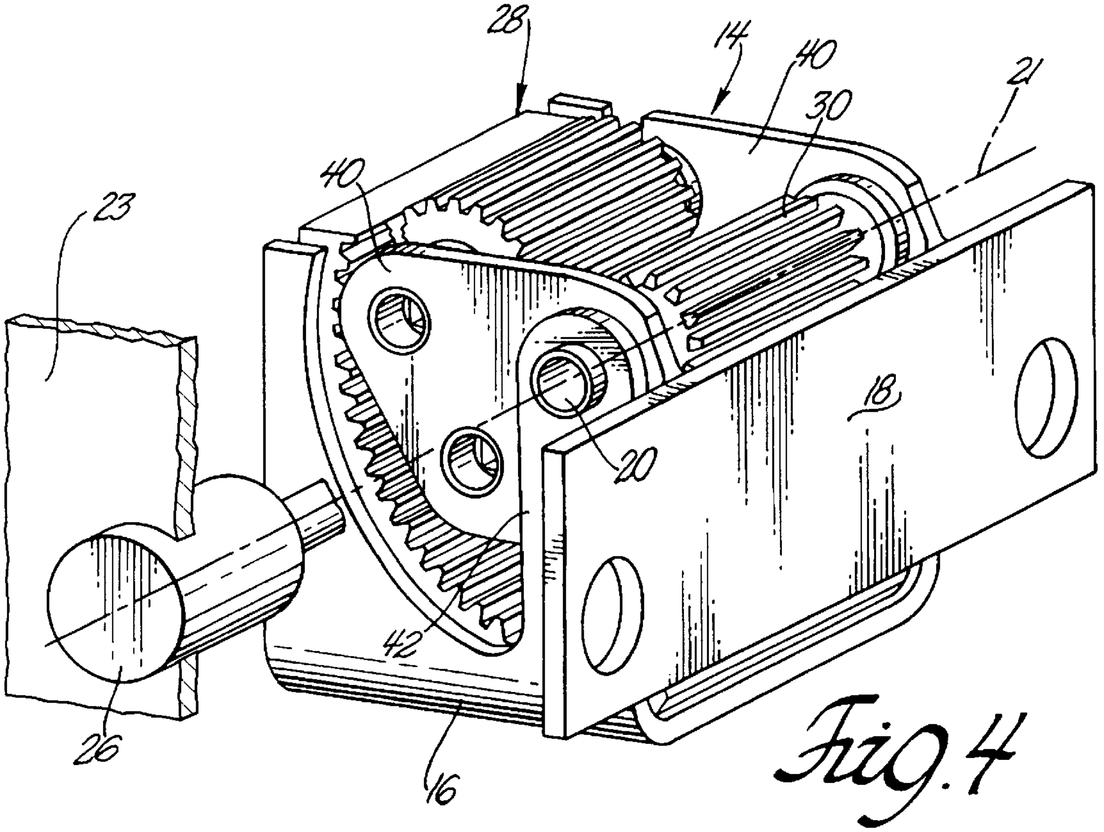
FIG. 4 is an enlarged perspective view of a component of the power operating system shown in FIGS. 1, 2 and 3.
Figure 2:
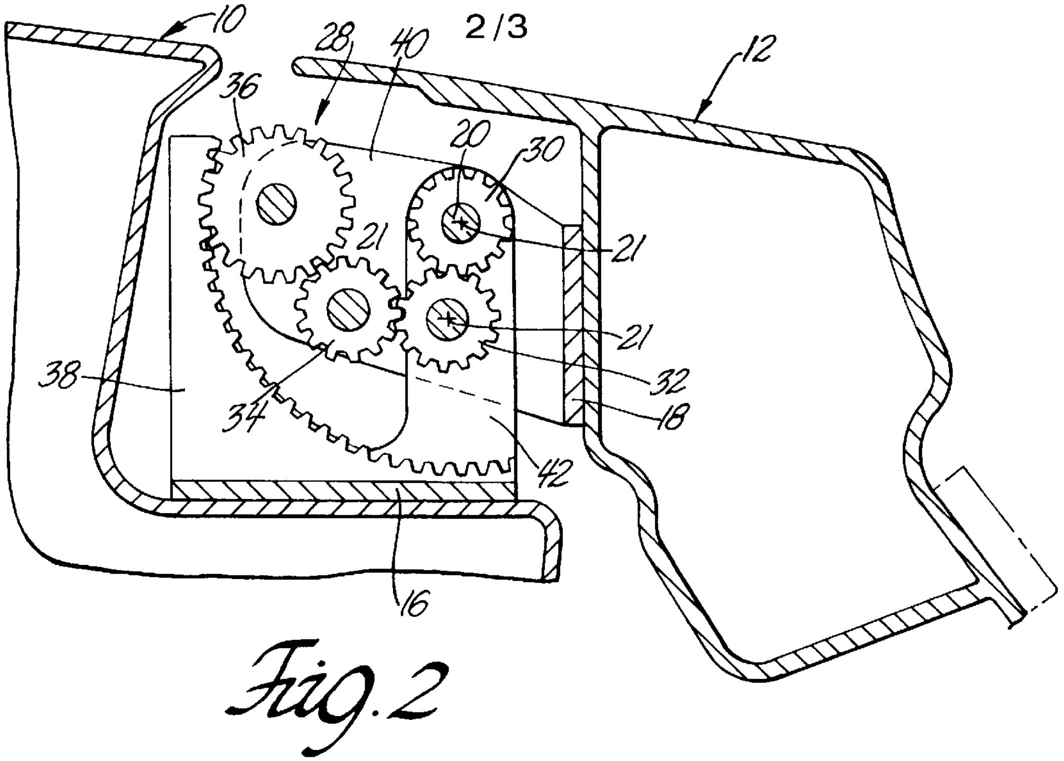
FIG. 2 is an enlarged side view of the power operating system taken substantially along the line 2—2 of FIG. 1 showing the power operating system when the liftgate is closed.
Figure 3:
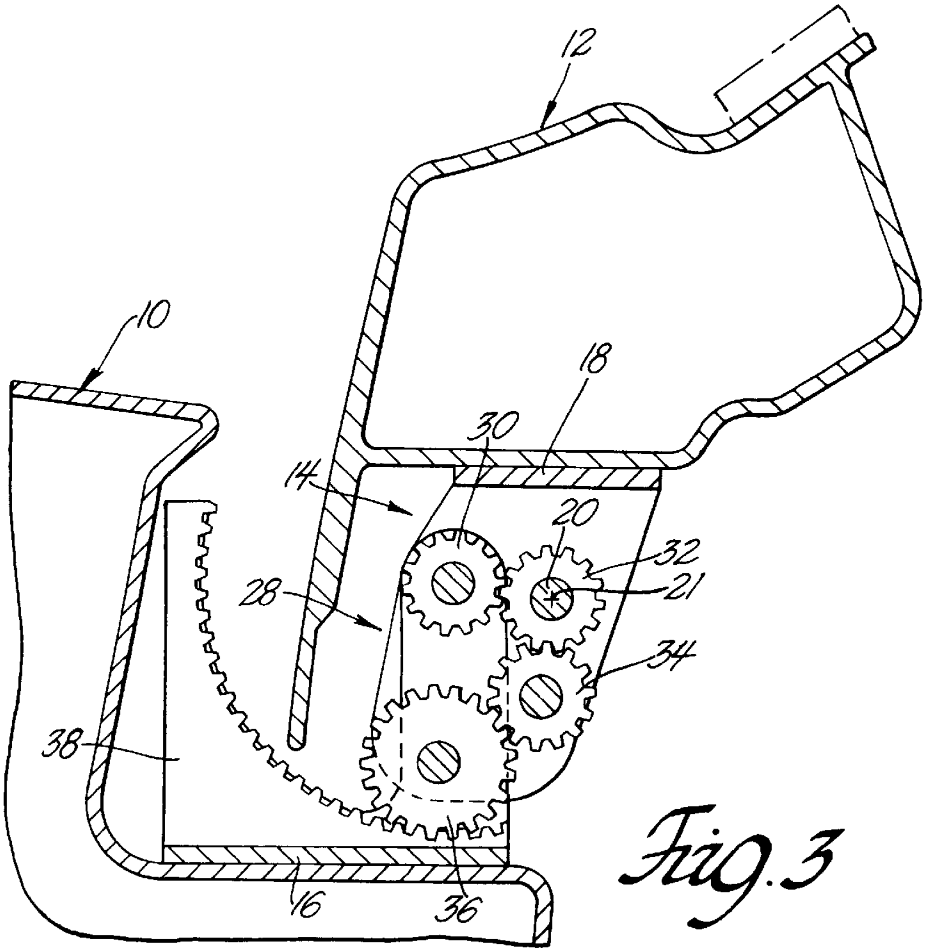
FIG. 3 is an enlarged side view of the power operating system shown in FIG. 2 showing the power operating system when the liftgate is open.

Vehicle 10 has a liftgate 12 that is attached to the aft end of the vehicle roof by two hinge assemblies 14. The typical right hand hinge assembly 14 is shown in FIGS. 2, 3 and 4.

Hinge assemblies 14 have hinge portions 16 that are secured to a roof channel of the vehicle 10 and hinge portions 18 that are secured to a top channel the liftgate 12. Hinge portions 18 are attached to hinge portions 16 by pivot pins 20 so that liftgate 12 pivots about a pivot axis indicated at 21 in FIGS. 2, 3 and 4 from a closed position shown in FIGS. 2 and 4 to a raised open position shown in FIGS. 1 and 3. Pivot axis 21 is generally substantially horizontal and liftgate 12 is generally permitted to pivot about 90° about pivot axis 21. However, the range of movement can be varied substantially from one vehicle 10 to another.

Liftgate 12 is opened and closed by a power operating system that includes two identical drive units 22 that are installed in the aft end of the vehicle roof. Drive units 22 are laterally spaced from each other and near the respective vertical body pillars at the aft end of vehicle 10 that define the rear opening that is closed by liftgate 12. The typical drive unit 22 is shown in FIGS. 2, 3 and 4.

Each drive unit 22 comprises a reversible electric motor 26 that is secured to the vehicle body in a fixed position for driving a compound planetary gear set 28 that is incorporated in the associated hinge assembly 14. Planetary gear set 28 comprises a sun gear 30, a first planet gear 32, a second planet gear 34, a third planet gear 36 and a ring or internal gear 38.

Hinge portion 18 includes two laterally spaced ears 40 that are pivotally mounted on pivot pin 20. Pivot pin 20 extends through holes in ears 40. Sun gear 30 is located between ears 40 and non-rotatably attached to pivot pin 20.

Planet gears 32, 34 and 36 are all located between ears 40 and rotatably attached to ears 40 so as to rotate about axes that are parallel to hinge axis 21 so that ears 40 operate in the maimer of a planetary gear carrier. Sun gear 30 meshes with first planet gear 32 which meshes with second planet gear 34 which meshes with third planet gear 36. Hinge portion 18, sun gear 30 and planet gears 32, 34 and 36 are preferably formed as a sub-assembly which is attached to hinge portion 16.

Hinge portion 16 has two laterally spaced arms 42 that straddle ears 40 of hinge portion 16 and rotatably support pivot pin 20. Pivot pin 20 is drive connected to electric motor 26. Ring gear 38 is secured to hinge portion 16 so that it is concentric with hinge axis 21 and so that it meshes with third sun gear 36. As illustrated ring gear 38 extends for about 90 degrees, or about a quarter of a circular cylinder. However, ring gear 38 may extend for a greater or lesser degree depending on the travel requirements of the lift gate 12.

The power operating system further includes a conventional power source such as the vehicle battery (not shown) and a suitable motor control for energizing and shutting off the reversible electric motor 26. Motor controls are well known to those skilled in the art and thus need not be described in detail.

Figure 1:
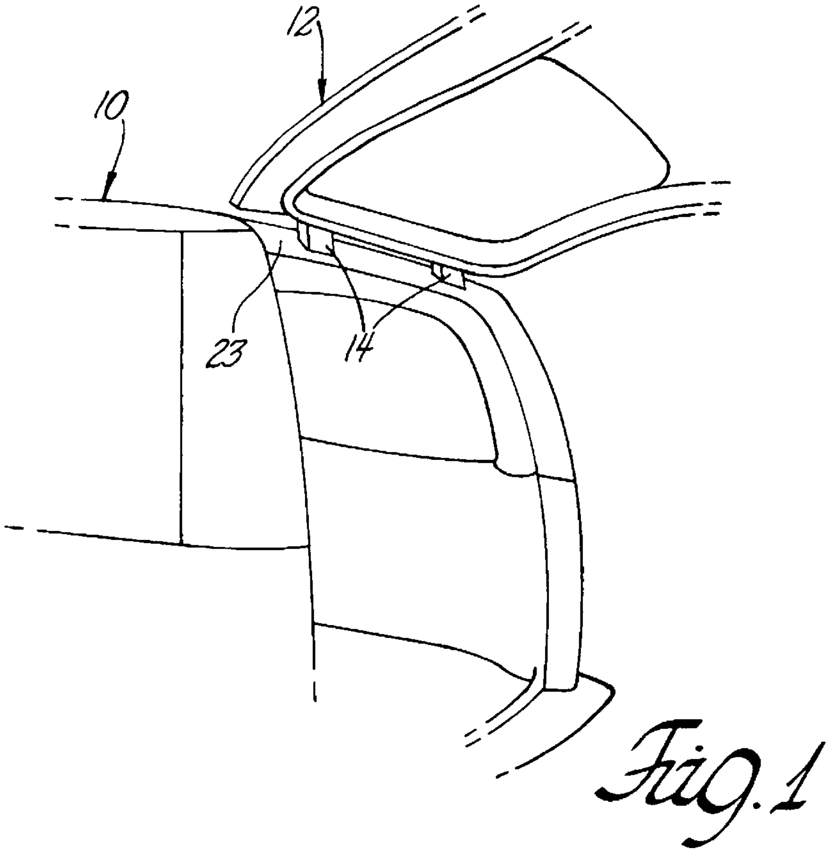
FIG. 1 is a perspective view of the rear portion of a vehicle with an open liftgate.

The power operating system operates as follows. Assuming that the liftgate 12 is open as shown in FIGS. 1 and 3, electric motor 26 is energized to close liftgate 12. When energized, electric motor 26 rotates sun gear 30 clockwise which rotates first planet gear 32 counterclockwise. Planet gear 32 in turn rotates second planet gear 34 clockwise. second planet gear 34 in turn rotates third planet gear 36 counterclockwise. This causes third planet gear 36 to walk up ring gear 38 and pivot hinge portion 18 and liftgate 12 to rotate clockwise from the raised open position shown in FIGS. 1 and 3 to the closed position shown in FIGS. 2 and 4. When the liftgate 12 is fully closed, a limit switch or the like is actuated to shut off electric motor 26. Liftgate 12 is opened by reversing electric motor 26 so that the compound planetary gear set 22 rotates hinge portion 18 and lift gate 12 counterclockwise back to the raised open position shown in FIGS. 1 and 3.

The power operating system described above preferably includes two identical drive units 22 for balanced operation and reduced manufacturing costs. However, the drive units need not be identical and in some instances, a single drive unit 22 or two hinge assemblies with planetary gear sets driven by a single reversible electric motor may be sufficient.

The advantage of having three planetary gears is that the gear set has a high gear ratio, $$\frac{Nring}{Nsun} + 1,$$

where Nring in the number of teeth in ring gear 38 and Nsun is the number of teeth in the sun gear 30. This high gear ratio provides high torque multiplication and speed reduction in a small space so that a high speed low torque electric motor can be used.

Figure 5:
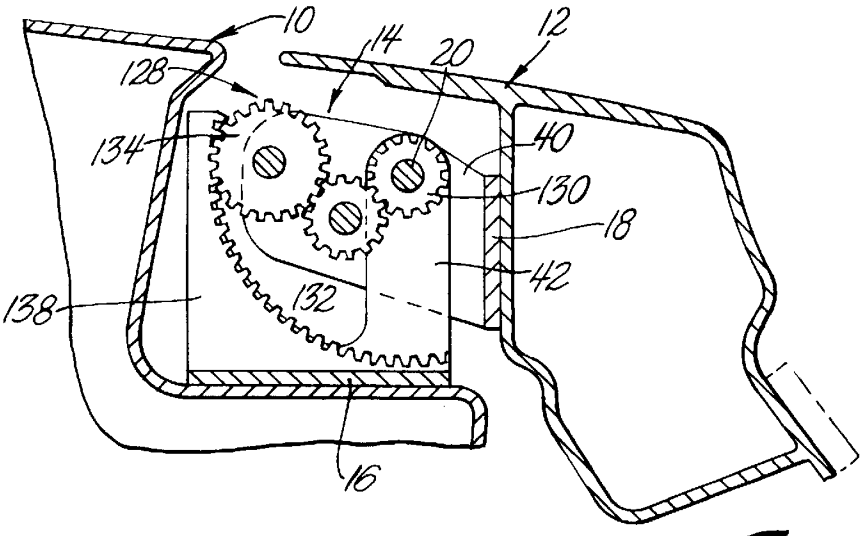
FIG. 5 is an enlarged side view of a modified power operating system showing the power operating system when the liftgate is closed.
Figure 6:
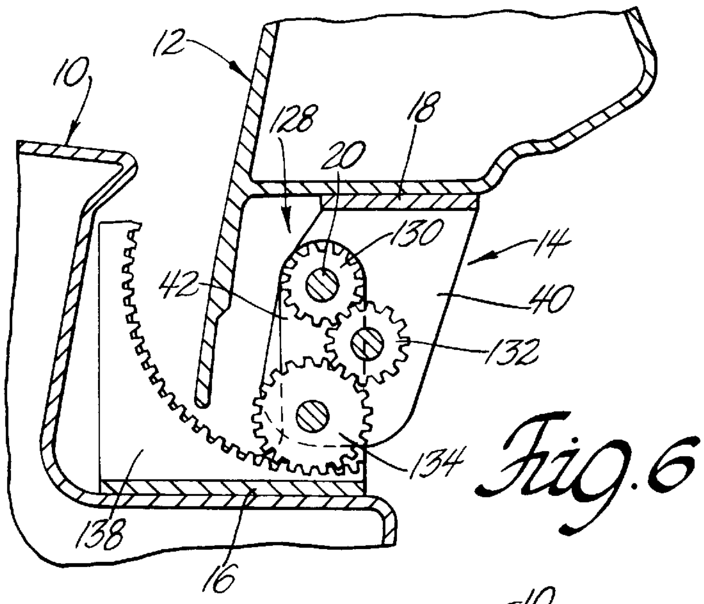
FIG. 6 is an enlarged side view of the modified power operating system shown in FIG. 5 showing the modified power operating system when the liftgate is open.

A modification of the invention is shown in FIGS. 5 and 6. This first modification still uses a compound planetary gear arrangement. However, the compound planetary gear set 128 comprises a sun gear 130, a first planet gear 132, a second planet gear 134 and a ring or internal gear 138. This eliminates one planet gear. The drive units are otherwise the same except that the polarity of the reversible electric motor has to be reversed. The advantage of having two planetary gears is that the complexity of the gear set is reduced while retaining a relatively high gear ratio of Nring/Nsun−1. This gear ratio still provides relatively high torque multiplication and speed reduction in a small space but may require a larger electric motor because of the minus one factor.

Figure 7:
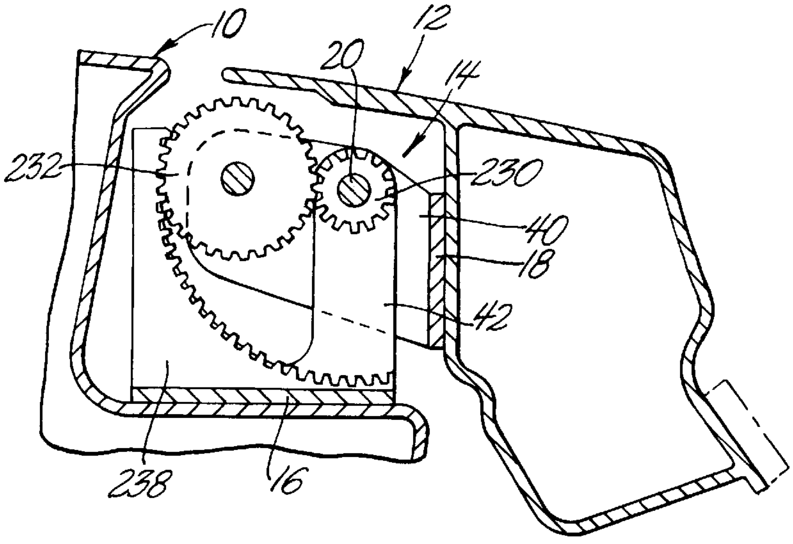
FIG. 7 is an enlarged side view of another power operating system.

Another modification of the invention is shown in FIG. 7. This second modification uses a simple planetary gear arrangement in which the planetary gear set 228 simply comprises a sun gear 230, a planet gear 232 and a ring or internal gear 238. The drive units are otherwise the same except that the polarity of the reversible electric motor has to be the same as in the case of the first embodiment shown in FIGS. 1–4. The advantage of having a simple planetary gear set is that it provides the same high gear ratio, Nring/Nsun+1 as the first embodiment of FIGS. 1–4 with a considerably simplified gear set. However, a larger space may be required than that which is available for a particular vehicle configuration.

Obviously, many modifications and variations of the present invention in light of the above teachings may be made. It is, therefore, to be understood that, within the scope of the appended claims, the invention may be practiced otherwise than as specifically described.

We claim:

1. In a vehicle having a power operating system for opening and closing a vehicle liftgate that is pivotally attached to an aft end of a roof of a vehicle body for pivotal movement about a generally horizontal pivot axis between an open position and a closed position, the power operating system comprising:

at least one drive unit that includes a reversible electric motor and a planetary gear set, the planetary gear set having a sun gear, a ring gear and at least one planet gear for transferring drive from the sun gear to the ring gear, and the sun gear and a generally horizontal output shaft of the electric motor being concentric with the pivot axis.

2. In a vehicle as defined in claim 1 wherein the planet gear of the power operating system is rotatably mounted on a carrier that pivots with the lift gate and the ring gear is fixedly attached to the vehicle body.

3. A power operating system for opening and closing a vehicle liftgate that is pivotally attached to an aft end of a roof of a vehicle body for pivotal movement about a generally horizontal pivot axis between an open position and a closed position comprising:

at least one drive unit that includes a reversible electric motor and a planetary gear set, the planetary gear set having a sun gear, a ring gear and at least one planet gear for transferring drive from the sun gear to the ring gear, the sun gear being concentric with the pivot axis and coupled to the electric motor, the planet gear being rotatably mounted on a carrier that pivots with the lift gate.

the ring gear being fixedly attached to the vehicle body, and the electric motor being fixedly attached to the vehicle body and the sun gear being rotatably mounted on an axis that is fixed with respect to the vehicle body.

4. The power operating system as defined in claim 3 wherein the planetary gear set is a compound planetary gear set having at least two planet gears that mesh with each other.

5. The power operation system as defined in claim 3 wherein the planetary gear set is a compound planetary gear set having a first planet gear meshing with the sun gear, a second planet gear meshing with the first planet gear and a third planet gear meshing with the second planet gear.

6. A power operating system for opening and closing a vehicle liftgate that is pivotally attached to an aft roof end of a vehicle body by a hinge that has a first hinge portion attached to the vehicle body, a second hinge portion attached to the liftgate and a pivot pin connecting the hinge portions for pivotal movement about a generally horizontal pivot axis of the pin, comprising:

at least one drive unit that includes a reversible electric motor and a planetary gear set, the planetary gear set having a sun gear, a ring gear and at least one planet gear for transferring drive from the sun gear to the ring gear, the sun gear being non rotatably connected to the pivot pin and coupled to the electric motor, the planet gear being rotatably mounted on a carrier that is attached to the second hinge portion that pivots with the lift gate, and the ring gear being fixedly attached to the vehicle body.

7. The power operating system as defined in claim 6 wherein the electric motor is fixedly attached to the vehicle body.

8. The power operating system as defined in claim 7 wherein the planetary gear set is a compound planetary gear set having at least two planet gears that mesh with each other.

9. The power operating system as defined in claim 8 wherein the planetary gear set is a compound planetary gear set having a first planet gear meshing with the sun gear, a second planet gear meshing with the first planet gear and a third planet gear meshing with the second planet gear.

10. The power operating system as defined in claim 7 wherein the ring gear is fixedly attached to the first hinge portion.

11. A power operating system for opening and closing a vehicle closure that is attached to a vehicle body for pivotal movement about a pivot axis between an open position and a closed position comprising:

at least one drive unit that includes a reversible electric motor and a planetary gear set, the planetary gear set having a sun gear, a ring gear and at least one planet gear for transferring drive from the sun gear to the ring gear, the sun gear being concentric with the pivot axis and coupled to the electric motor, the planet gear being rotatably mounted on a carrier that pivots with the closure, the ring gear being fixedly attached to the vehicle body, the electric motor being fixedly attached to the vehicle body, and the sun gear being rotatably mounted on an axis that is fixed with respect to the vehicle body.

* * * * *